United States Patent
Yi et al.

(10) Patent No.: US 9,866,658 B2
(45) Date of Patent: Jan. 9, 2018

(54) METHOD AND APPARATUS FOR SAS OPEN ADDRESS FRAME PROCESSING IN SAS EXPANDERS

(71) Applicant: Microsemi Storage Solutions, Inc., Aliso Viejo, CA (US)

(72) Inventors: Cheng Yi, Vancouver (CA); Heng Liao, Belcarra (CA); Calvin Leung, Burnaby (CA)

(73) Assignee: MICROSEMI STORAGE SOLUTIONS, INC., Aliso Viejo, CA (US)

( * ) Notice: Subject to any disclaimer, the term of this patent is extended or adjusted under 35 U.S.C. 154(b) by 0 days.

(21) Appl. No.: 15/297,625

(22) Filed: Oct. 19, 2016

(65) Prior Publication Data

US 2017/0099371 A1    Apr. 6, 2017

Related U.S. Application Data

(62) Division of application No. 11/412,944, filed on Apr. 28, 2006, now abandoned.

(60) Provisional application No. 60/675,878, filed on Apr. 29, 2005.

(51) Int. Cl.
| | |
|---|---|
| *H04L 29/14* | (2006.01) |
| *H04L 12/741* | (2013.01) |
| *H04L 12/751* | (2013.01) |
| *H04L 12/931* | (2013.01) |
| *H04L 29/08* | (2006.01) |

(52) U.S. Cl.
CPC .............. *H04L 69/40* (2013.01); *H04L 45/08* (2013.01); *H04L 45/745* (2013.01); *H04L 49/356* (2013.01); *H04L 67/1097* (2013.01)

(58) Field of Classification Search
CPC ... H04L 41/069; H04L 43/0817; H04L 69/40; H04L 67/1097; H04L 49/356; H04L 45/745; H04L 45/08
See application file for complete search history.

(56) References Cited

U.S. PATENT DOCUMENTS

| | | | |
|---|---|---|---|
| 5,307,345 A | 4/1994 | Lozowick et al. | |
| 5,521,913 A * | 5/1996 | Gridley | H04L 12/44 370/389 |
| 5,978,853 A | 11/1999 | Crayford et al. | |
| 6,222,840 B1 | 4/2001 | Walker et al. | |
| 6,233,243 B1 | 5/2001 | Ganmukhi et al. | |
| 6,301,637 B1 | 10/2001 | Krull et al. | |

(Continued)

OTHER PUBLICATIONS

U.S. Appl. No. 11/412,944, Office Action dated Jun. 20, 2014.
(Continued)

*Primary Examiner* — Joe Chacko
(74) *Attorney, Agent, or Firm* — Leber IP Law; Dennis R. Haszko

(57) ABSTRACT

SAS expanders are commonly used within a SAS network topology to allow multiple disk drives (targets) to connect to multiple host devices (initiators). A connection between an initiator and a target is setup inside an expander on the pathway between the initiator and the target. A source device sends a connection request message called an open address frame using in-band signaling. The expander processes the open address frame and forwards an modified open address frame to the next expander in the path or to the final destination device.

14 Claims, 13 Drawing Sheets

(56) References Cited

U.S. PATENT DOCUMENTS

| | | |
|---|---|---|
| 6,522,656 B1 | 2/2003 | Gridley |
| 6,728,249 B2 | 4/2004 | Chang |
| 7,334,042 B2 | 2/2008 | Day et al. |
| 7,353,302 B2* | 4/2008 | Seto .................... G06F 13/4022 709/225 |
| 2004/0100944 A1 | 5/2004 | Richmond et al. |
| 2004/0190554 A1 | 9/2004 | Galloway |
| 2005/0066100 A1 | 3/2005 | Elliott et al. |
| 2005/0138191 A1 | 6/2005 | Seto et al. |
| 2005/0138261 A1 | 6/2005 | Viarushak et al. |
| 2006/0004935 A1 | 1/2006 | Seto et al. |
| 2006/0015659 A1 | 1/2006 | Krantz et al. |
| 2006/0041699 A1 | 2/2006 | Day et al. |
| 2006/0095589 A1* | 5/2006 | Seto ........................ H04L 29/06 709/246 |
| 2007/0070885 A1* | 3/2007 | Uddenberg ......... H04L 43/0817 370/225 |
| 2007/0214303 A1* | 9/2007 | Bashford .............. G06F 13/385 710/314 |

OTHER PUBLICATIONS

U.S. Appl. No. 11/412,944, Office Action dated Aug. 15, 2012.
U.S. Appl. No. 11/412,944, Office Action dated Mar. 13, 2013.
U.S. Appl. No. 11/412,944, Office Action dated Mar. 18, 2011.
U.S. Appl. No. 11/412,944, Office Action dated Nov. 1, 2013.

* cited by examiner

METHOD AND APPARATUS FOR SAS OPEN ADDRESS FRAME PROCESSING IN SAS EXPANDERS

CROSS REFERENCE TO RELATED APPLICATIONS

This application is a divisional of U.S. patent application Ser. No. 11/412,944 filed Apr. 28, 2006, which claims the benefit of priority from U.S. Provisional Application No. 60/675,878 filed Apr. 29, 2005, the disclosures of which are incorporated herein by reference.

FIELD OF THE INVENTION

The present invention relates generally to frame processing in an in-band connection setup signaling application, where the signaling information is packet switching oriented. More particularly, the present invention relates to SAS open address frame processing in a SAS expander device.

BACKGROUND OF THE INVENTION

Serial Attached SCSI (Small Computer System Interface), or SAS, is a connection-oriented protocol that allows storage devices, like servers and disk drives, to communicate through a network of high-speed serial physical interconnections. Intermediate devices called expanders manage connections between a host device and a target drive. SAS expanders act as connection management agents, much like a switch element, having physical connections to multiple host devices or disk drives simultaneously. In SAS, a physical link is typically a set of four signal lines used as two differential pairs. A "PHY" is a transceiver that electrically interfaces with a physical link combined with the portions of the protocol that encode data and manage the reset sequences. A port is created when one or more PHYs share the same address and attach to a device through one or more physical links.

A connection is a temporary association between a SAS initiator port and a SAS target port. During a connection all Dwords (for "double word"—two words each composed of two bytes) from the SAS initiator port are forwarded to the SAS target port, and all Dwords from the SAS target port are forwarded to the SAS initiator port. A connection is established through a connection signaling process defined in the SAS standard. Though the SAS data transfer protocol is connection-oriented, the connection signaling protocol is packet-oriented.

There are two types of SAS frames: those transmitted when there is no connection established, and those transmitted during a connection. SAS frames transmitted when there is no connection established are called SAS address frames. The two address frames defined in the SAS link layer are the IDENTIFY address frame and the OPEN address frame. Transmission of these frames is immediately preceded by an SOAF (start of address frame) primitive and immediately followed by an EOAF (end of address frame) primitive. To establish a connection, a source port (in either an initiator or a target) sends a connection request in the form of an "open address frame" data packet. The expander device processes the open address frame and forwards the modified open address frame to the next expander device on the pathway or to the final destination port (in either an initiator or a target).

FIG. 1 shows an example of how a connection is setup normally in a SAS network between an initiator and a target. As shown in step 102 of FIG. 1, a host bus adaptor (HBA) 120 sends a connection request, or an open address frame, to expander 122. After receiving the open address frame, the expander 122 determines the destination port based on the destination address in the open address frame and establishes an internal connection between the source port, at which the open address frame is received, and the destination port. The expander 122 then forwards the open address frame through the internal connection to the destination port, as illustrated in step 104. The expanders 124 and 126 then repeat what is done in expander 122 as shown in steps 106 and 108 in FIG. 1. After these relays, the open address frame finally reaches the final destination port in a hard disk drive (HDD) 128. The HDD 128 then responds to the open address frame by sending out an OPEN_ACCEPT primitive, see the following document for details on primitive definition: ANSI INCITS. T10/1601-D Revision 6—Serial Attached SCSI (SAS), Oct. 2, 2004 (also referred to as the SAS standard), which is incorporated herein by reference. The OPEN_ACCEPT primitive is then transferred along the physical connection all the way back to the original source port in the HBA 120, which completes the connection setup, as shown in step 110 of FIG. 1.

In expander devices, the SAS standard defines the following functions: two or more PHYs, expander connection manager (ECM) and expander connection router (ECR). An external expander port contains one or more physical PHYs. Each expander PHY contains an expander link layer with a connection state machine and a reset state machine. The expander link layers within an expander PHY request and respond to connection requests independently. A source PHY is defined as a PHY from which an open frame is received, and a destination PHY is defined as a PHY to which the source PHY is connected.

The expander connection manager (ECM) performs the following functions: a) maps a destination SAS address in a connection request to a destination PHY using direct, subtractive, or table routed addressing methods; b) arbitrates and assigns or denies path resources for connection requests following SAS arbitration and pathway recovery rules; and c) configures the ECR. The expander connection router (ECR) routes messages between pairs of expander phys (source PHY and destination) as configured by the ECM.

The SAS standard defines an open address frame that contains an identification of link protocol, connection type, destination port address, source port address, priority counters and CRC. Table 1 provides details on the contents of an open address frame, shown in relation to Dword number.

TABLE 1

Open Address Frame Contents

| Dword Number | Description | Processing in expander |
| --- | --- | --- |
| 1 | Protocol/Connection Rate | Routing: Arbitration |
| 2 | Destination SAS Address [63:32] | Routing: Lookup |
| 3 | Destination SAS Address [31:0] | |
| 4 | Source SAS Address [63:32] | Routing: Arbitration |

TABLE 1-continued

Open Address Frame Contents

| Dword Number | Description | Processing in expander |
|---|---|---|
| 5 | Source SAS Address [31:0] | |
| 6 | Priority Counter | Routing: Arbitration |
| 7 | Reserved | |
| 8 | CRC | Error Checking |

The 2nd and 3rd Dwords include destination SAS device address information. The destination SAS device address determines which PHY in the expander is the destination PHY to which the source PHY will be connected.

The 1st Dword contains an identification of the link protocol of the connection and connection rate. The 4th and 5th Dwords are the source port address and the 6th Dword comprises priority counters including Pathway Blocked Counter and Arbitration Wait Timer. The parameters of connection link protocol, connection rate, source port address, Pathway Blocked Counter and Arbitration Wait Timer are all used for arbitration when multiple connection requests to the same destination PHY are pending in an expander. The last Dword is the CRC of the whole open address frame and is used for checking frame error. If a CRC error is detected, the open request is discarded.

The SAS standard also defines the process of routing an open address frame in source PHY, ECM and ECR. FIG. 2 illustrates an example of how the process can be practically implemented. Reference numerals 201-209 in FIG. 2 indicate an event number of a processing event; an event with a larger number depends on an event with a lower number. Note that only one source PHY and destination PHY related to the open address frame are shown here.

The event sequence illustrated in FIG. 2 is as follows:

Step 201. Receive and store open address frame (in source PHY 220). When an open address frame arrives at a PHY, it will be first stored in an open address frame context in the PHY.

Step 202. CRC check (in source PHY). After the whole open address frame is received, the CRC will be checked. If the CRC is correct, go to the next step. If CRC check fails, discard the open address frame.

Step 203. Open request to ECM (in source PHY). An open request is asserted to ECM 224 to indicate there is an open request pending in the PHY.

Step 204. Enable load (in ECM). After receiving an open request, the ECM determines whether to load the open request context. Open request context is defined as a subset of the open address frame comprising routing information such as SAS destination, source addresses and priority for address lookup and arbitration in ECM. An open request context can be loaded only if the previous arbitration window is finished.

Step 205. Load open request context (in source PHY) and store open request context (in ECM). After receiving load enable confirmation from ECM, the source PHY starts to load the open request context to the ECM, and the ECM stores it in ECM open request context registers.

Step 206. Address lookup (in ECM). The ECM starts an address lookup to determine which PHY would be a destination PHY after the whole open frame context is received from the source PHY.

Step 207. Arbitration (in ECM). If more than one open request is designated to one destination PHY, the ECM will perform arbitration based on the priorities of the open request indicated in the open request context.

Step 208. PHY selection (in ECM). When arbitration is finished, the ECM acknowledges to the source PHY whether the open request is accepted, rejected or is pending. In the meantime, if the open request is accepted, the ECM will configure ECR 226 to setup a connection between the source PHY and the destination PHY 228.

Step 209. Forward open address frame. After the arbitration result is received from the ECM, if it is to accept the open request, the source PHY start to forward the open address frame with modified priority counters through the ECR to the destination PHY along the connection setup by ECM in step 208.

Note that parallel to these steps, the arbitration wait timer keeps ticking in the source PHY as long as the open address frame has been received. As a result, the final forwarded open address frame is different from what is received in the source PHY, since the arbitration wait timer value is set to be the current value of the timer, not the initial received value.

For a SAS expander device, the connection setup time delay between receiving an open address frame in the source PHY and transmitting the open address frame in the destination PHY is crucial for entire SAS network performance in setting up connections. The intuitive way of implementing open address frame processing in both source PHY and ECM as described above uses the store-and-forward operation, which serializes each step of the processing. This negates any advantages offered by the parallelization of the steps. There are times during operation of such a device when transmission of a packet could begin before the entire packet had been received, and the packet could be passed straight through from one network to another, with practically no delay. This mode of operation is referred to as cut-through operation. Some bridges provide for operation in this mode, in a packet-switched networking context. Some examples include: U.S. Pat. No. 5,307,345 issued Apr. 1, 1994 to Philip P. Lozowick and Siman-Tov Ben-Michael; U.S. Pat. No. 6,522,656 issued Feb. 18, 2003 to Curtis D. Gridley; U.S. Pat. No. 6,233,243 issued May 15, 2001 to Mahesh N Ganmukhi and Prasasth R. Palnati; U.S. Pat. No. 6,728,249 issued Apr. 27, 2004 to Chi-Hua Chang; and Serial Attached SCSI (SAS) Standard (ANSI INCITS. T10/1601-D Revision 6—Serial Attached SCSI (SAS), Oct. 2, 2004). However, there are no similar approaches for SAS expander devices.

It is, therefore, desirable to provide a system and method for handling SAS open frame and expander device operation including at least some steps in parallel.

SUMMARY OF THE INVENTION

It is an object of the present invention to obviate or mitigate at least one disadvantage of previous SAS expanders and open frame handlers.

In an aspect, the present invention provides a method for processing an open address frame in a serial attached SCSI (SAS) network. The method includes the following steps: asserting an open request to an expander connection manager (ECM) of an expander while the open address frame is still being received at a source PHY; loading an open request context from the source PHY to the ECM in response to a load enable signal; and performing an address lookup to determine a destination PHY while the open request context is still being loaded.

The method can further include performing arbitration in response to completion of a CRC check when the entire open address frame has been received at the source PHY. The CRC check can be initiated when the address lookup and the open request context loading have been completed. The method can further include: providing an arbitration result to the source PHY; setting up a connection between the source PHY and the destination PHY in response to the arbitration result being an accept signal; and forwarding the open address frame with modified priority counters to the destination PHY along the connection. The open request can be asserted in response to receipt of a start of address frame primitive of the open address frame. The address lookup can be initiated in response to receipt of a destination address of the open address frame. An open address frame context can be stored in the source PHY in response to receipt of a start of address frame primitive of the open address frame. The method can include a frame type check to confirm a received frame is an open address frame.

The method can further include: waiting for the next valid open address frame Dword before aborting the processing of the open address frame; aborting the processing of the open address frame in response to an open address frame reception error; waiting for further address lookup data before aborting the processing of the open address frame; or aborting the processing of the open address frame in response to an address lookup error, or to a timeout condition. A new lookup and arbitration window can be started upon completion of the arbitration. A timeout timer can be started at the beginning of each new lookup and arbitration window.

The open request context can include a destination SAS address in first and second Dwords, and can also include information regarding protocol and connection rate in the same Dword as a priority counter. The processing steps can be separately performed for each port in the expander. In that case, the ECM can start the arbitration when there are no remaining pending open request context load requests and no remaining pending address lookups for any PHY.

In another aspect, the present invention provides a link connection controller for processing an open address frame in a serial attached SCSI (SAS) network, comprising: an open address frame processor to assert an open request to an expander connection manager (ECM) of an expander while the open address frame is still being received at a source PHY; an open request context processor to perform an address lookup to determine a destination PHY while the open request context is still being loaded; and an arbitrator to perform arbitration in response to completion of a CRC check after the entire open address frame has been received at the source PHY.

The arbitrator can include means to provide an arbitration result to the source PHY, set up a connection between the source PHY and the destination PHY in response to the arbitration result being an accept signal, and forward the open address frame with modified priority counters to the destination PHY along the connection. The controller can further include: a rate accommodator to accommodate variable port transmission rates by introducing wait states; a load value indicator to identify received data as a Dword or a gap; or a receive data converter to convert a one-byte wide PHY input to a 32 byte wide Dword.

In a further aspect, the present invention provides an open request context signal embodied in a carrier wave, the signal including: a first data segment comprising a destination SAS address in first and second Dwords; and a second data segment comprising information regarding protocol and connection rate in the same Dword as a priority counter.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
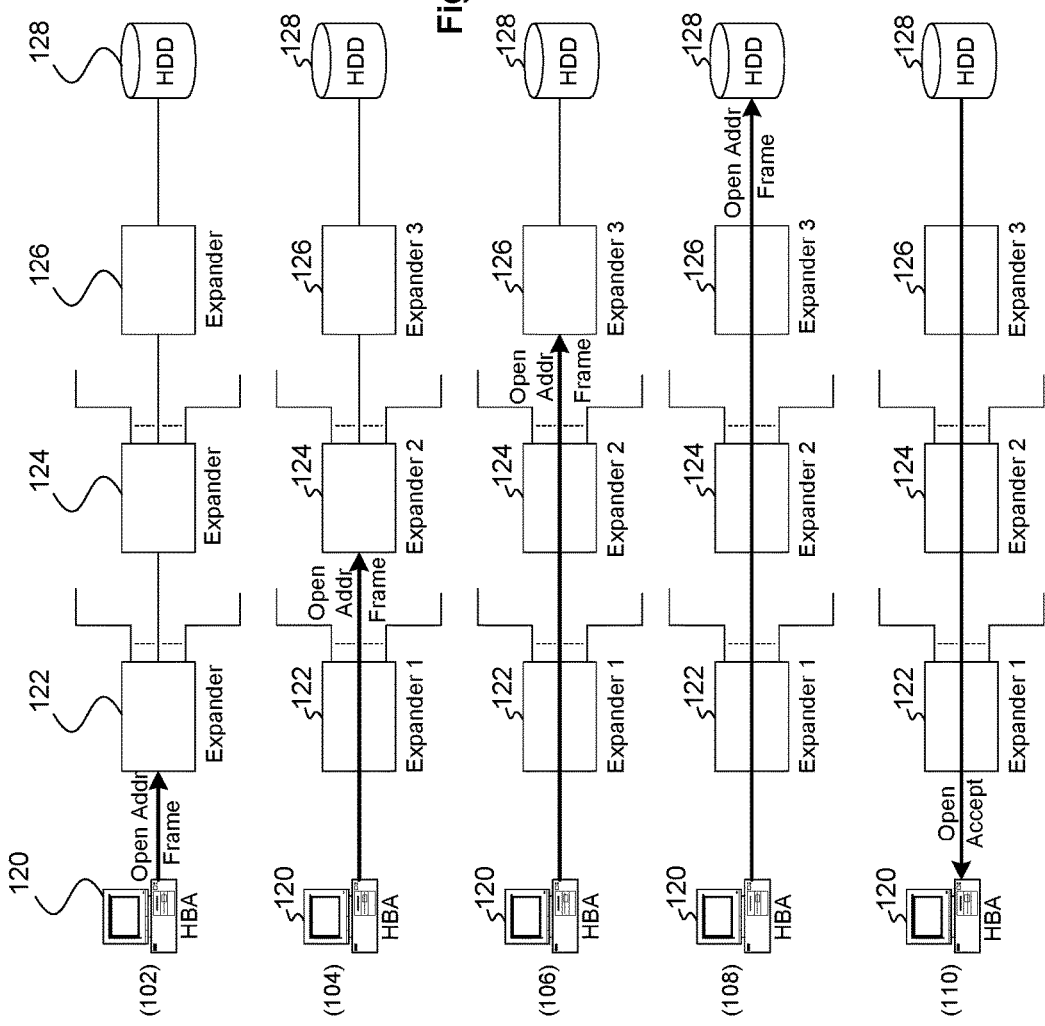
FIG. 1 illustrates a known connection setup in an SAS network.

Generally, the present invention provides a method and system for processing steps in parallel in both source PHY and ECM to minimize the connection setup time delay and yield a novel solution for fast connection setup in SAS expander devices.

SAS expanders are commonly used within a SAS network topology to allow multiple disk drives (targets) to connect to multiple host devices (initiators). A connection between an initiator and a target is set up inside the expander device(s) on the pathway between the initiator and the target. To establish a connection, a source device (initiator or target) sends a connection request, such as an in-band signaling "open address frame" message. The expander device processes the open address frame and forwards a modified open address frame to the next expander device on the pathway or to the final destination device (an initiator or a target). A known method for a SAS expander to process the open address frame is based on store-and-forward operation as specified in the SAS specification, which does not take advantage of the benefits of parallelization. Embodiments of the present invention provide a novel method in which cut-through operation is implemented in the expander device to process the open address frame. This reduces the processing time in each expander on the pathway between an initiator and a target and ultimately aids in optimizing the throughput of the whole SAS network.

The term "open address frame" as used herein represents a connection request, or connection setup request, from an initiator to a target in a network, such as a SAS network. An open address frame according to the SAS standard includes information regarding link protocol, connection type, destination port address, source port address, priority counters and cylindrical redundancy check (CRC) bits.

The term "open address frame context" as used herein represents a subset of an open address frame, typically excluding the CRC bits and protocol/connection rate Dwords.

The term "open request" as used herein represents a request for a connection, as defined in an open address frame. An open request can be initiated or asserted before the entire open address frame is received, since it only requires enough information necessary to advise an expander of the destination address in the open address frame.

The term "open request context" as used herein represents a subset of the open address frame comprising routing information such as SAS destination, source addresses and priority for address lookup and arbitration in the ECM. An open request context can be loaded only if the previous arbitration window is finished. An open request context includes more information than the open request, but less information than the entire open address frame. The open request context also preferably changes the order and content of some of the Dwords as compared with the open address frame, and can omit some information, to enable more efficient processing.

The system and methods of the present invention utilize cut-through operation in at least two points of open address processing. One point is in the source PHY for asserting an open request to an ECM while the open address frame is still being received. Another point is in ECM for address lookup while the open request context is still being loaded. In each of these cut-through implementations, the particular operation is begun at an earlier time than with known approaches. In one embodiment, as soon as the destination SAS address has been received, the system can begin to implement portions of the open address processing; it does not have to wait to receive the other parts of the open address frame. This cut-through approach can be employed to reduce latency in a 36-port implementation or any implementation where the time delay is too long to be able to accommodate customer requirements.

The process according to an embodiment of the present invention is much faster than known approaches, since some of the parallel processes can begin as soon as the destination address has been received, without waiting for the rest of the open frame. However, the approach according to embodiments of the present invention is more complicated with respect to error handling, since processing begins on the open frame before it is determined whether there is an error. Three developments include: the two cut-throughs; and the error handling, which will be described later.

There are three processing threads of events, or processes, taking place in parallel. Thread 1: Storing open address frame and performing CRC check in source PHY; Thread 2: Asserting open request to ECM and loading the open request context upon confirmation of load enabling; and Thread 3: Destination address lookup in ECR. Thread 1 and Thread 2 start at the same time, preferably after the start of address frame primitive (SOAF) is received. Thread 3 starts after the destination address has been loaded. Before arbitration takes place, the three processing threads end and are synchronized. Each of the threads is now described in further detail with respect to FIG. 3. Threads 1, 2 and 3 are described in relation to 311-312, 321-324, and 331, respectively. Step 300 of receiving the open address frame precedes the three threads.

In Thread 1 (or process 1) represented by light solid lines, when an open address frame arrives at a PHY, it is stored in step 311 in an open address frame context register in the PHY. After the whole open address frame is received, in step 312 the CRC will be checked. The CRC check result, whether the CRC is correct or has errors, should be loaded into ECM.

In Thread 2 (or process 2), represented by dashed lines, as soon as an open address frame is received, an open request is asserted (or automatically forwarded) in step 321 to the ECM to indicate that there is an open request pending in the PHY. After the open request has been received, the ECM determines whether to load the open request context, remembering that typically an open request context can be loaded only when the previous arbitration window is finished. If circumstances permit, the load is immediately initiated. It is possible, due to clock acceleration, that the load enabling is faster than the line and that the rest of the frame is not in the source PHY yet. In that case, gaps exist. Known approaches do not include ways to handle such gaps; gap handling will be described later in relation to embodiments of the present invention. In step 322, the ECM sends a load enable confirmation to the source PHY. In step 323, after receiving the load enable confirmation, the source PHY starts to load the open request context to the ECM. The ECR crossbar datapath can be set up to connect the source PHY to the ECM to transfer the open address frame from the source PHY to the ECM, or a dedicated bus can be used for the transfer of the open address frame. And the ECM stores the open request content in ECM open request context registers in step 324.

In Thread 3 (or process 3), represented by dotted lines, the ECM starts performing an address lookup in step 331 to determine which PHY would be a destination PHY. This scenario, when the open request context has been loaded, is the second cut-through where the system does not wait for the whole frame. Again, only the destination address is needed, and the destination address is at the beginning of the open frame.

Figure 2:
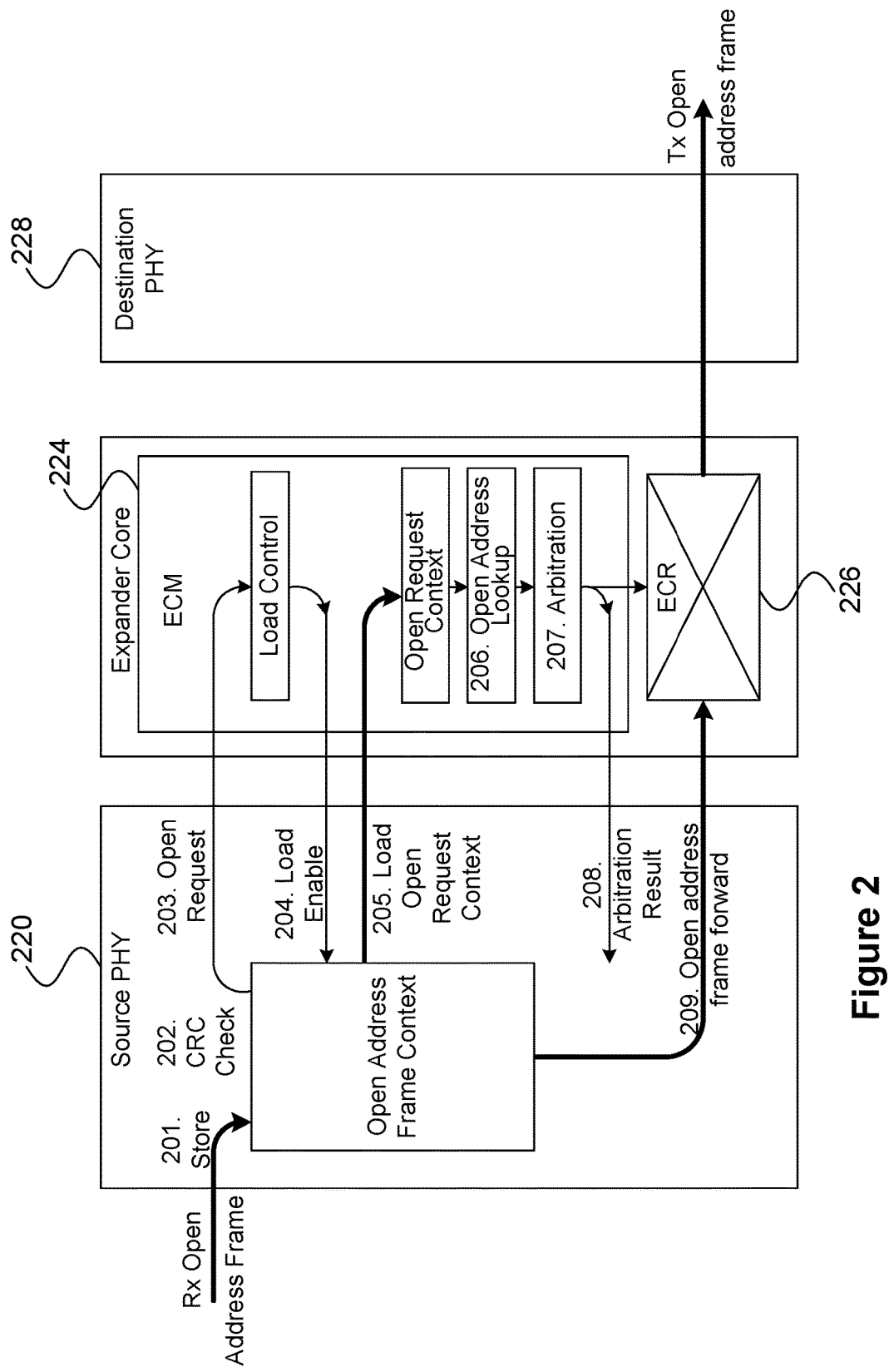
FIG. 2 illustrates a process of open address frame handling in an SAS Expander.
Figure 3:
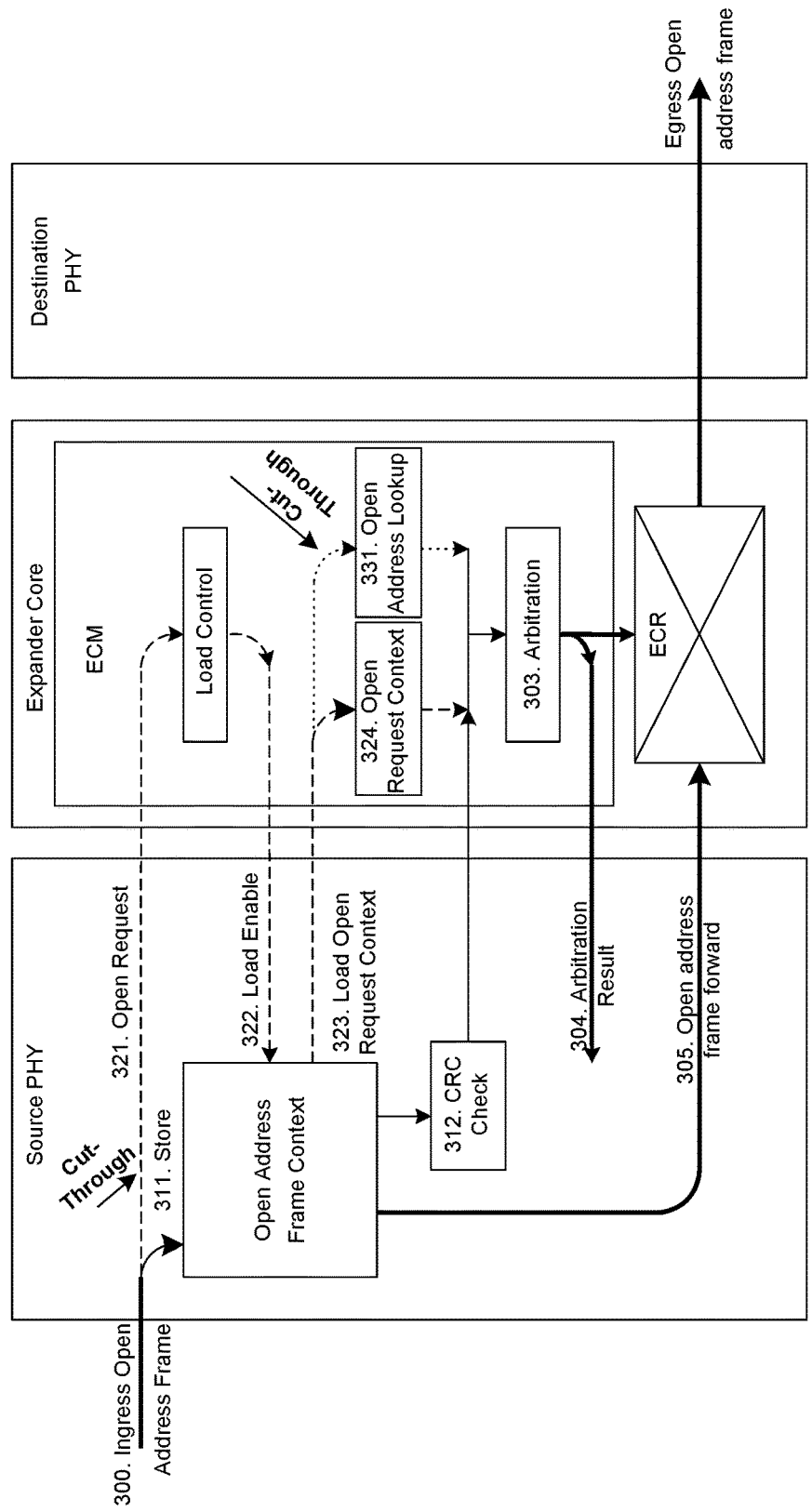
FIG. 3 illustrates a process of open address processing with cut-through implemented in both source PHY and ECM according to an embodiment of the present invention.

While the two parallel processes Thread 2 and Thread 3 can be implemented before the entire open frame is received, the entire method cannot proceed further until the CRC check in Thread 1 is completed. The point at which the three separate parallel processes, i.e. the three Threads, meet in FIG. 3 is called the synchronization point, which is prior to the arbitration step. From the arbitration step on, steps 303-305 are substantially similar to steps 207-209 in FIG. 2, but will be described for the sake of completeness. In step 303, if more than one open request is designated to one destination PHY, the ECM performs arbitration based on the priorities of the open request indicated in the open address frames. In step 304, when arbitration is finished, the ECM provides the arbitration result to the source PHY, indicating whether the open request is accepted, rejected or is pending. In the meantime, if the open request is accepted, the ECM will configure the ECR to setup a connection between the source PHY and the destination PHY. In step 305, after the arbitration result is received from ECM, if it is to accept the open request, the source PHY starts to forward the open address frame with modified priority counters through ECR to the destination PHY along the connection setup by ECM in the previous step.

In summary, in an aspect, the present invention provides a method for processing an open address frame in a serial attached SCSI (SAS) network. The method includes the following steps: asserting an open request to an expander connection manager (ECM) of an expander while the open address frame is still being received at a source PHY; loading an open request context from the source PHY to the ECM in response to a load enable signal; and performing an address lookup to determine a destination PHY while the open request context is still being loaded.

The method can further include performing arbitration in response to completion of a CRC check when the entire open address frame has been received at the source PHY. The CRC check can be initiated when the address lookup and the open request context loading have been completed. The method can further include: providing an arbitration result to the source PHY; setting up a connection between the source PHY and the destination PHY in response to the arbitration result being an accept signal; and forwarding the open address frame with modified priority counters to the destination PHY along the connection. The open request can be asserted in response to receipt of a start of address frame primitive of the open address frame. The address lookup can be initiated in response to receipt of a destination address of the open address frame. An open address frame context can be stored in the source PHY in response to receipt of a start of address frame primitive of the open address frame. The method can include a frame type check to confirm a received frame is an open address frame.

To properly implement the above-described method of cut-through processing of an open address frame, the following special issues are preferably considered:
- Gap Handling: Gap handling allows gaps to exist during the open request context loading to accommodate for different rates of various PHYs and for clock skew.
- Error Handling: Error handling aborts open request context load and lockup processing before the arbitration process starts, in the case of CRC error and any other protocol error when loading an open request context.
- Lockup Handling: Lockup handling prevents the entire expander device from being locked up when receiving an orphan open address frame in a PHY. This is preferably achieved via a timeout mechanism.

Open address frame receive control logic is implemented in the link layer of a PHY. State machines shown in FIGS. 4-7 elaborate on how to implement what is described in FIG. 3. A state machine is a model of computation consisting of a set of states, a set of start states, an input alphabet, and a transition function which maps input symbols and current states to a next state, and is usually understood to be a finite state machine. In general, a state machine is any device that stores the status of something at a given time and can operate on input to change the status and/or cause an action or output to take place for any given change. Therefore, each state machine can be seen as a way to represent functions that can be performed by an embodiment of the present invention, either implemented as hardware, or as a set of statements and instructions stored on a computer-readable memory which, when executed, cause a computer to perform steps in a method. Each state machine can be implemented as a processor (either a dedicated processor, or a separate part of a larger processor).

Figure 4:
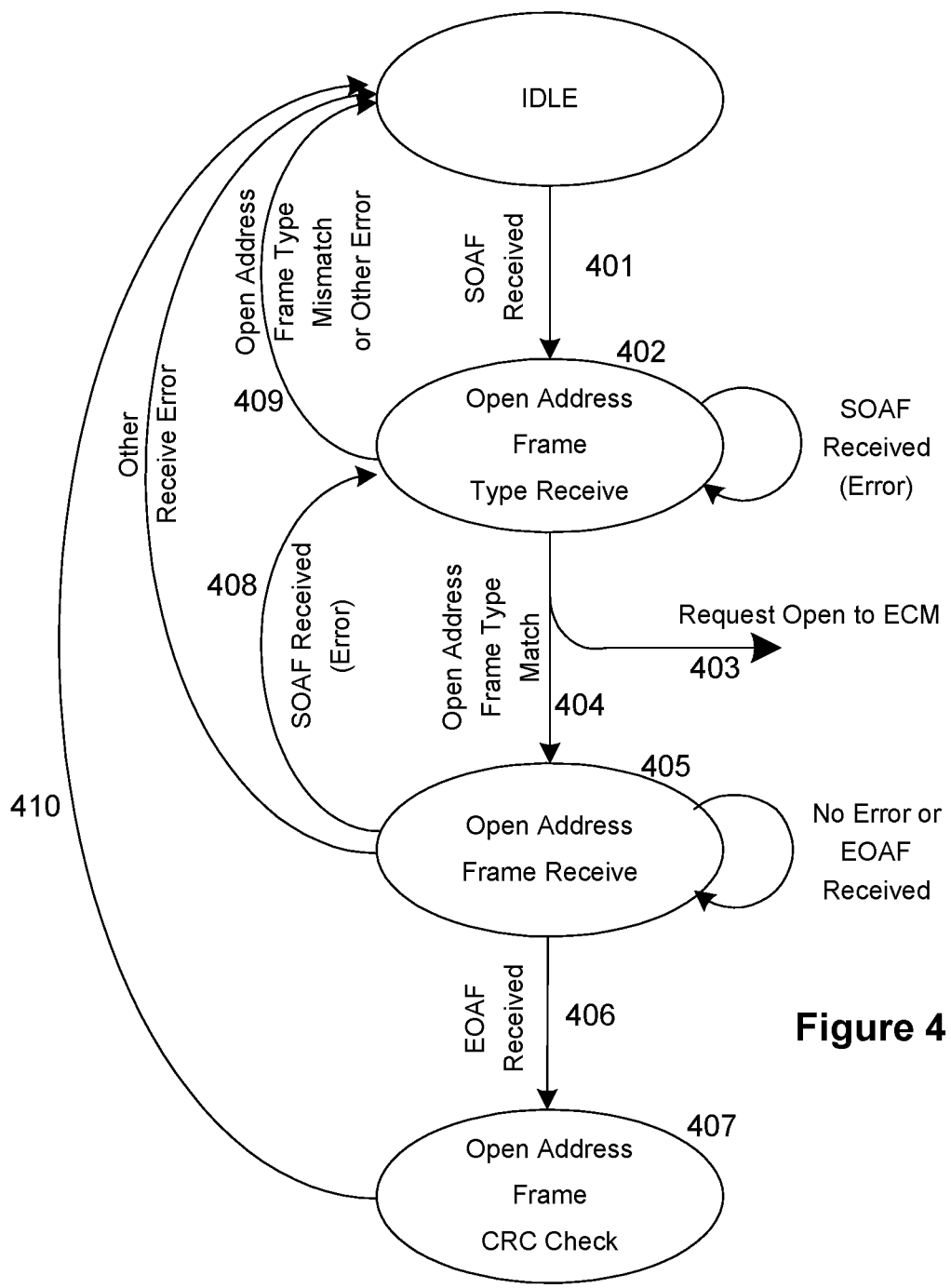
FIG. 4 illustrates a state machine for open address frame receive control.

FIG. 4 illustrates a state machine that can be used to control the reception of an open address frame. This state machine represents functions to be performed by a link connection controller, or another component of (or in communication with) the ECM. The state machine starts in step 401 with the detection of an open address frame that is delimited by a SOAF (Start Of Address Frame) primitive, and ends after the detection of the EOAF (End Of Address Frame) primitive delimiting the end of the open address frame in step 406.

In state 402, the open address frame type is received. The open address frame load request is asserted to ECM in step 403 after receipt of the first Dword of the open address frame, which includes the frame type field. A frame type check in step 404 is used to identify the received frame as an open address frame, as opposed to another address frame (e.g. IDENTIFY address frame). Any protocol error, e.g. any primitive in the middle of the frame or CRC error, that is received after the open address frame load request is asserted in the frame receive state 405 or frame CRC check state 407 preferably aborts the corresponding processes already started for open address frame loading and lockup in both PHY and ECM. Steps 408 and 409 illustrate termination steps due to errors, and step 410 illustrates proper termination after CRC check.

The open request context cut-through loading control logic is preferably implemented in the link layer of a PHY. Open request context includes partial content of a received open address frame. To implement cut-through mechanism more efficiently, the format of open request context loaded to ECM is preferably designed as described in Table 2.

TABLE 2

Open Request Context Format

| Dword Number | Description | Processing in expander |
|---|---|---|
| 1 | Destination SAS Address [63:32] | Routing: Lookup |
| 2 | Destination SAS Address [31:0] | |
| 3 | Source SAS Address [63:32] | |
| 4 | Source SAS Address [31:0] | |
| 5 | Protocol/Connection Rate/Priority Counter | Routing: Arbitration |
| 6 | CRC | Routing: Arbitration Note CRC value itself is not used in ECM. This cycle is solely used for indication of CRC check result |

The open request context has the destination address in the first and the second Dwords while Protocol/Connection Rate are shared in the same Dword as the priority counter.

In other words, in an embodiment the present invention provides an open request context data structure, or signal embodied in a carrier wave, the signal including: a first data segment comprising a destination SAS address in Dwords 1 and 2; and a second data segment comprising information regarding protocol and connection rate in the same Dword as a priority counter.

Figure 5:
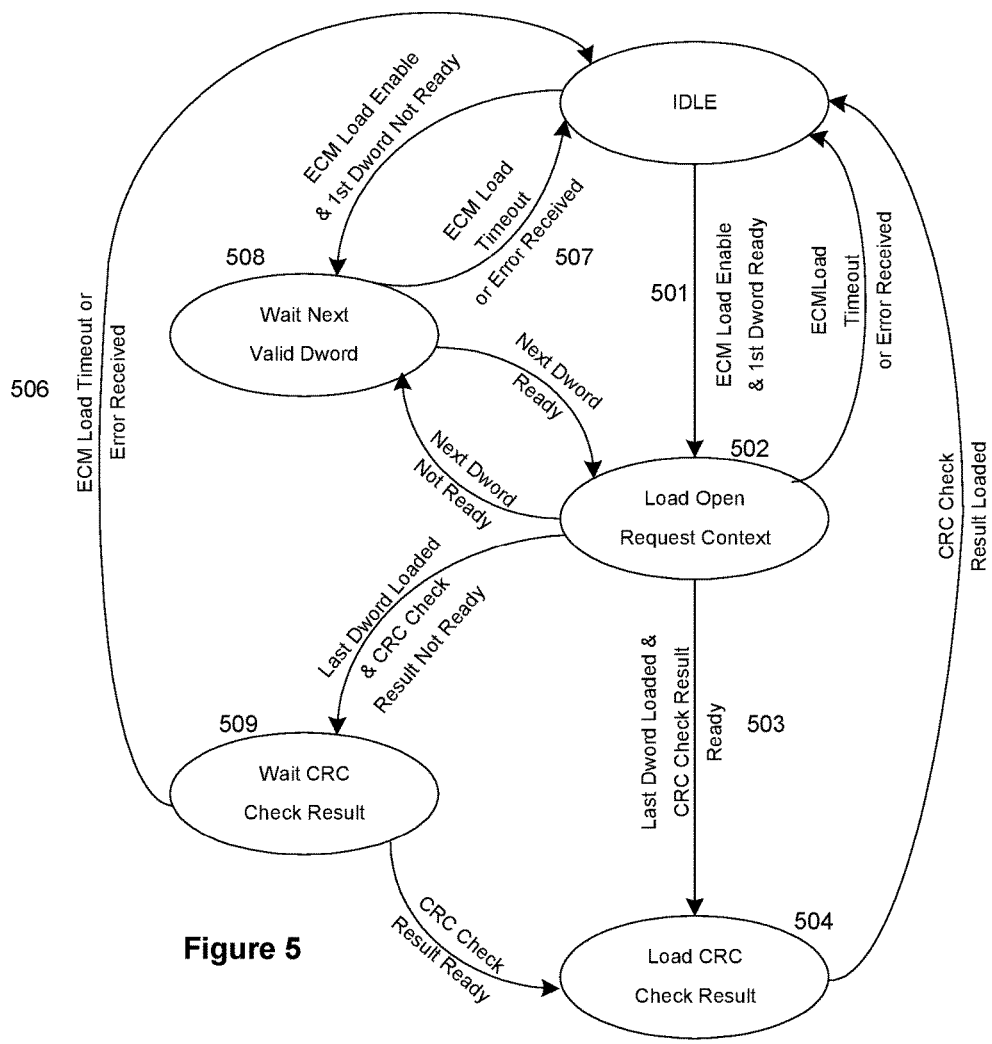
FIG. 5 illustrates an open address cut-through loading state machine.

FIG. 5 illustrates a state machine that can be used to control the open request context load to ECM. The state machine starts in step 501 with an ECM load enable assertion and ends after state 504 when the CRC check result has been loaded to ECM after a successful open request context load. The process includes state 502 of loading the open request context, and state 504 of loading the CRC check result. The process passes from state 502 to 504 via step 503 when the last Dword is loaded and the CRC check result is ready. Termination to the idle state following positive CRC check result loading occurs in step 505. When a receive error is detected in the PHY or when timeout is triggered in an ECM during loading, such as in steps 506 and 507, the open request context load process is aborted and the state machine transitions to an idle state. Two wait states 508 and 509 are provided to handle the case when next data is not available while in the middle of loading. This allows gaps to exist during the open request context loading process to accommodate different rates of various ports and clock skew. Even though detection of a CRC error normally returns a state machine to its idle state, the load process in ECM is still aborted to prevent the load process from ending before the CRC result is loaded.

The address lookup procedure includes some partial arbitration operations that do not need to wait for synchronization with address lookup results from other PHYs. The ECM open address frame cut-though processing logic can be implemented in two types of state machine: per PHY open request context load and lookup state machine and ECM arbitration state machine which control ECM overall open address frame processing.

Figure 6:
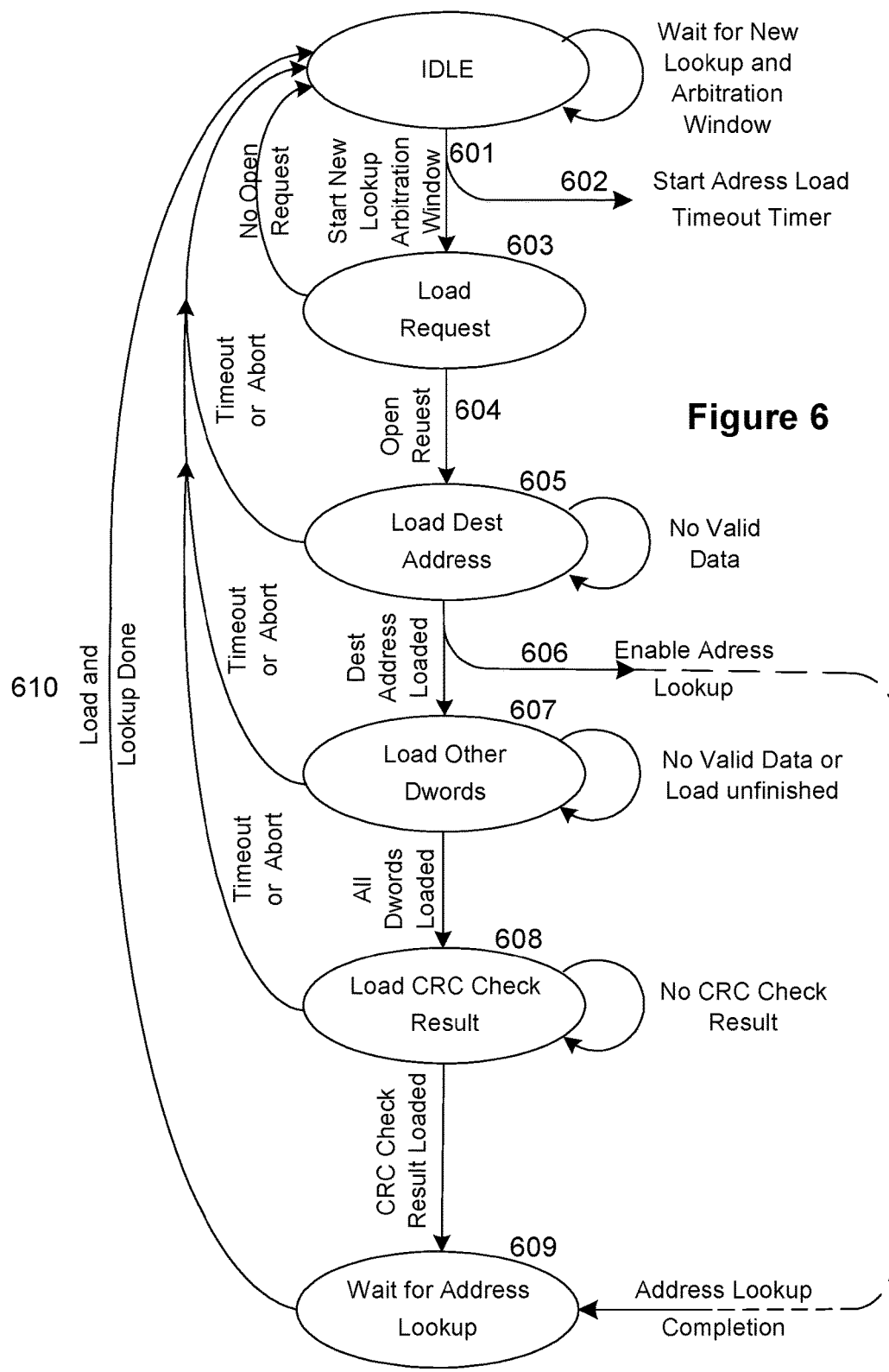
FIG. 6 illustrates an ECM open request context load state machine.

An embodiment of a per port open request context load and lookup state machine is illustrated in FIG. 6. This state machine illustrates the process of open request context load and address lookup. These are the two processes, or threads, that can be started before the entire open address frame is received. In the ECM, a lookup and arbitration window is defined as a cycle starting from loading open address frame request to the completion of arbitration and ECR routing. In step 601, the ECM starts a new lookup and arbitration window by starting an address load timeout timer in step 602, and by loading an open request in step 603. The ECM then in step 604 enables loading of an open request context from all the PHYs, which have asserted the open address frame request prior to the start of the lookup and arbitration window. ECM then loads open request context from all the corresponding PHYs. State 605 represents the loading of the destination address. The open address lookup process is enabled in step 606 (represented by dashed lines) after the first two Dwords have been loaded into ECM in each PHY. The ECM then loads the rest of the open request context in states 607 and 608 and performs address lookup from the address lookup table to find the destination PHY in the expander from the destination address loaded.

The ECM then preferably starts the arbitration process after 1) there is no open request context load pending for any PHY and 2) after no address lookup is pending for any PHY. This is illustrated at wait state 609, which is the intersection of the two processes after states 607 and 608, as well as completion of the address lookup. In other words, the wait state is the synchronization point for the end of both loading and lockup processes. The time at which these conditions are met for each PHY may differ due to the data rate and clock skew difference between PHYs. Before the arbitration process starts, it is desirable to have synchronization among all the PHYs. When the ECM has completed the arbitration, the next lookup and arbitration window starts. The timeout timer for preventing the ECM from lockup is reset and restarted at the beginning of the lookup and arbitration widow. This can prevent the ECM from locking up upon receipt of an orphan open address frame in a PHY. The timeout event or a PHY abort (when the PHY detected an error) preferably forces the ECM to abort the current load process for the corresponding PHY if either occurs during the loading of an open address frame.

Figure 7:
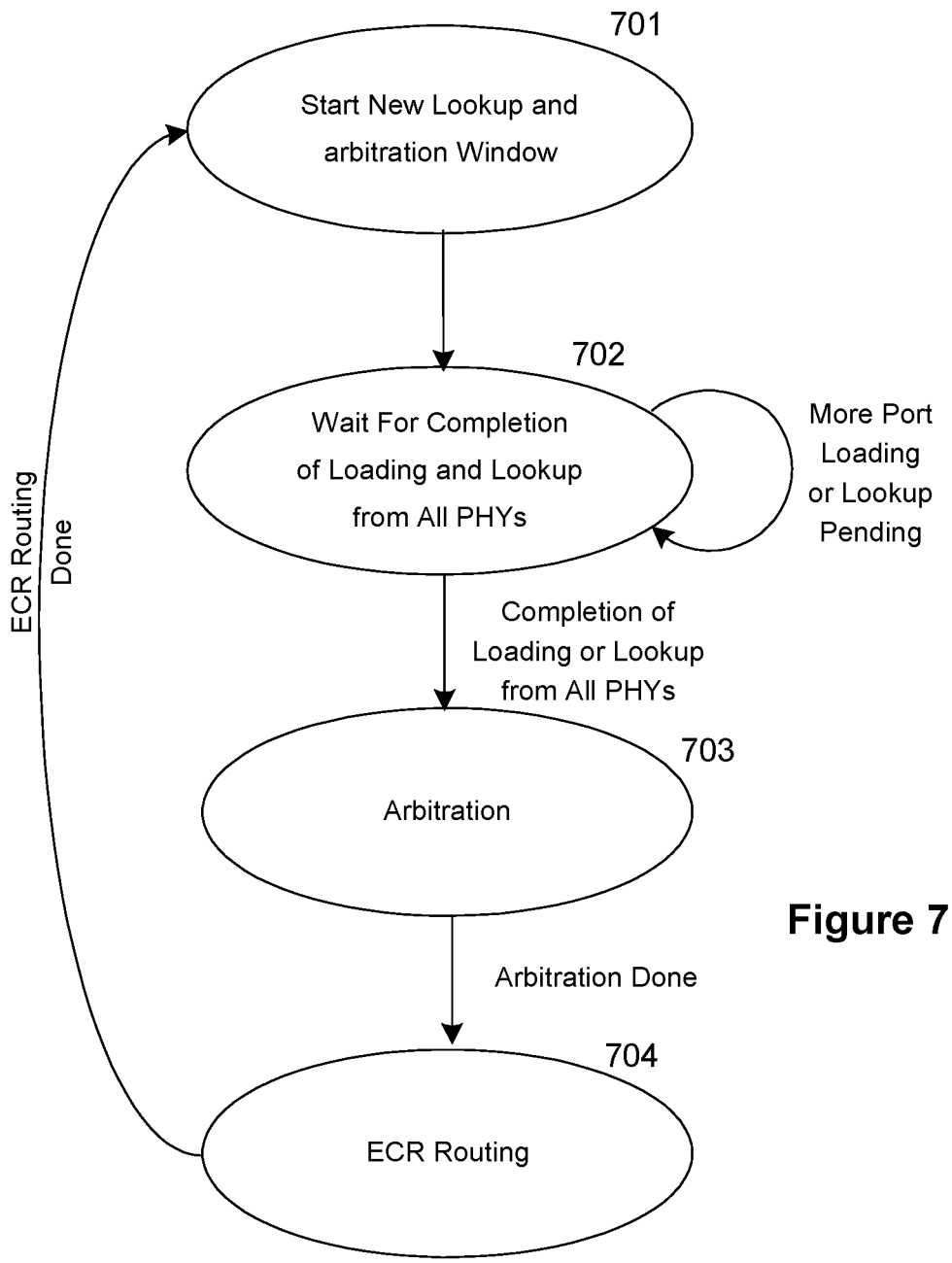
FIG. 7 illustrates an ECM arbitration control state machine.

An arbitration state machine, an embodiment of which is illustrated in FIG. 7, controls the overall process of open address frame routing in the ECM. After ECM starts a new lookup and arbitration window in step 701 (similar to step 601), in state 702 it waits for completion of the open request context loading and address lookup for each PHY from which an open address frame request has been received. The wait state 702 is the synchronization point for the open address frame processing from each PHY before arbitration. Upon completion of the arbitration state 703 and the ECR routing state 704, the lookup and arbitration window ends and starts a new window.

The interface between a PHY and the ECM for cut-through open request context loading is described below in relation to a system of the present invention. Several examples are presented to summarize open address frame loading processes in normal cases, and cases in which errors occur.

To summarize, a method according to an embodiment of the present invention can include: waiting for the next valid open address frame Dword before aborting the processing of the open address frame; aborting the processing of the open address frame in response to an open address frame reception error; waiting for further address lookup data before aborting the processing of the open address frame; or aborting the processing of the open address frame in response to an address lookup error, or to a timeout condition. A new lookup and arbitration window can be started upon completion of the arbitration. A timeout timer can be started at the beginning of each new lookup and arbitration window. The open request context can include a destination SAS address in Dwords 1 and 2, and can also include information regarding protocol and connection rate in the same Dword as a priority counter. The processing steps can be separately performed for each port in the expander. In that case, the ECM can start the arbitration when there are no remaining pending open request context load requests and no remaining pending address lookups for any PHY.

An open request context loading interface between a PHY and the ECM is preferably designed such that state machines inside a PHY and in the ECM are co-ordinated.

Table 4 describes an interface that can be provided (or error handling

TABLE 4

| Signal (per PHY) | Direction | Description |
| --- | --- | --- |
| ECM_REQ | PHY to ECM | ECM request indicator from a PHY. When there is an open address frame request, the PHY will acknowledge the ECM through ECM_REQ signal and the ECM will respond by asserting the ECM_LOAD signal to read the request in from the ECM data bus. |

TABLE 4-continued

| Signal (per PHY) | Direction | Description |
| --- | --- | --- |
| ECM_LOAD | ECM to PHY | Load new open request context data onto the ECR data bus ECR_RDAT[31:0].<br>When ECM_LOAD = '1', the corresponding PHY can load the open request context data onto the ECR data bus if applicable. When ECM_LOAD = '0', the PHY should stop loading the rest of the open request context data onto ECR data bus. The ECM load signal can be asserted for a maximum number of clock cycles, such as 32 clock cycles or any other user programmable timeout value. The ECM will abort arbitration for any open request context that cannot be transacted within that time limit. |
| ECM_LOAD_VAL | PHY to ECM | A PHY can toggle ECM_LOAD_VAL to pause the open request context transfer onto the ECR data bus. When ECM_LOAD_VAL is low, the transfer is paused. Otherwise, the transfer continues. |
| ECM_LOAD_OK | PHY to ECM | ECM load okay indicator from a PHY. The ECM_LOAD_OK should remain asserted throughout the open request context transfer. Otherwise, the open address frame is deemed corrupted, and the ECM will discard the loaded request. |
| ECR_RDAT[31:0] | PHY to ECM/ECR | The 32-bit wide data bus carries open request context data when outside connection. ECR_RDAT[31:0] also carries in-connection data or control primitives (to ECR).<br><br>| Valid Dword # | ECR_RDAT[31:0] Format (ECM_LOAD_VAL = '1') |<br>| --- | --- |<br>| 1 | Destination SAS Address [63:32] |<br>| 2 | Destination SAS Address [31:0] |<br>| 3 | Source SAS Address [63:32] |<br>| 4 | Source SAS Address [31:0] |<br>| 5 | Protocol/Connection Rate/Priority Counter |<br>| 6 | CRC | |

When a PHY receives an open address frame, it preferably asserts open ECM_REQ (referred to previously as an "open request"). When ECM has detected the request, it asserts ECM_LOAD signal at the earliest opportunity to initiate the loading of open request context into ECM. The PHY can deassert the ECM_LOAD_VAL signal at any time during the transaction to pause the transfer. Unless a PHY wishes to abort the transaction early due to detection of an error (protocol error or CRC error), the ECM_LOAD_OK signal is preferably not toggled low after it is asserted high. The last CRC cycle does not typically contain useful data but its companion ECM_LOAD_OK signal preferably indicates whether the transaction has succeeded or failed. Upon receiving the last data word, the ECM will deassert the ECM_LOAD signal in 2 clock cycles. The ECM_LOAD signal is preferably not toggled low during the transaction unless a timeout event occurs. If the transaction fails due to ECM_LOAD_OK or ECM_LOAD deassertion in the middle of the transaction, the open request will be ignored and not used for arbitration. Only those PHYs whose open request context has been successfully loaded will be used for arbitration process.

According to an embodiment of the present invention, there is no need to forward the Dword frame type for processing. As such, there are only six Dwords.

Figure 8:
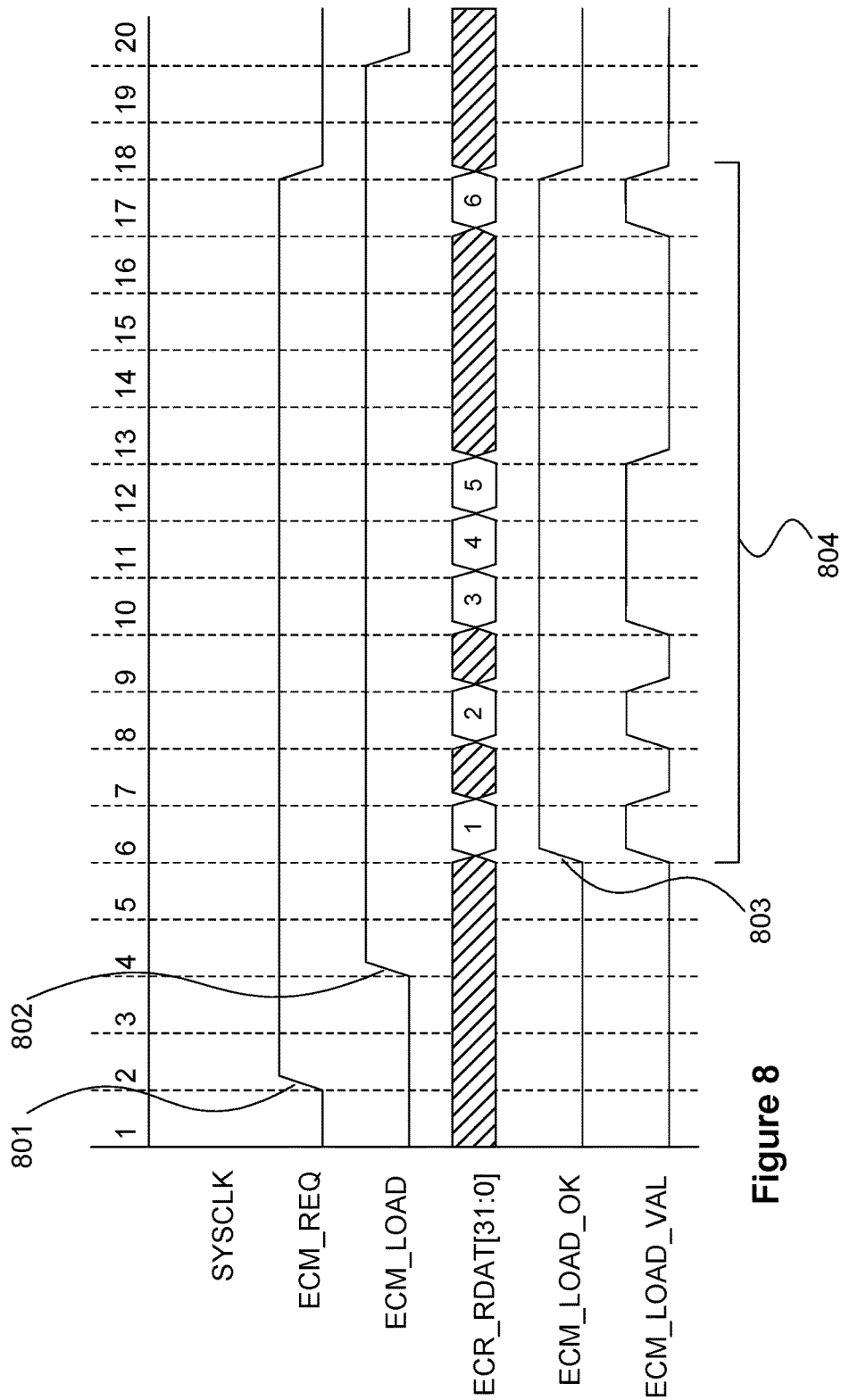
FIG. 8 illustrates a timing diagram for open request context loading: normal case with gaps.

The waveforms in FIGS. 8-11 are functional timing diagrams describing error handling over a plurality of clock cycles according to embodiments of the present invention. FIG. 8 illustrates successful loading of an open request context. The following steps are illustrated in FIG. 8: Step 801—Issue ECM request signal; Step 802—Start arbitration window in ECM, and begin ECM load; Step 803—Issue Load OK signal, which should stay "high" for all of the Dwords (including gaps); Step 804—A Load Value signal indicates if the load is a received Dword or a gap; and Step 805—If CRC is high, the Load OK signal stays "high" until the last Dword, then the Load OK signal switches to "low", and the whole process is deemed to be successful.

Figure 9:
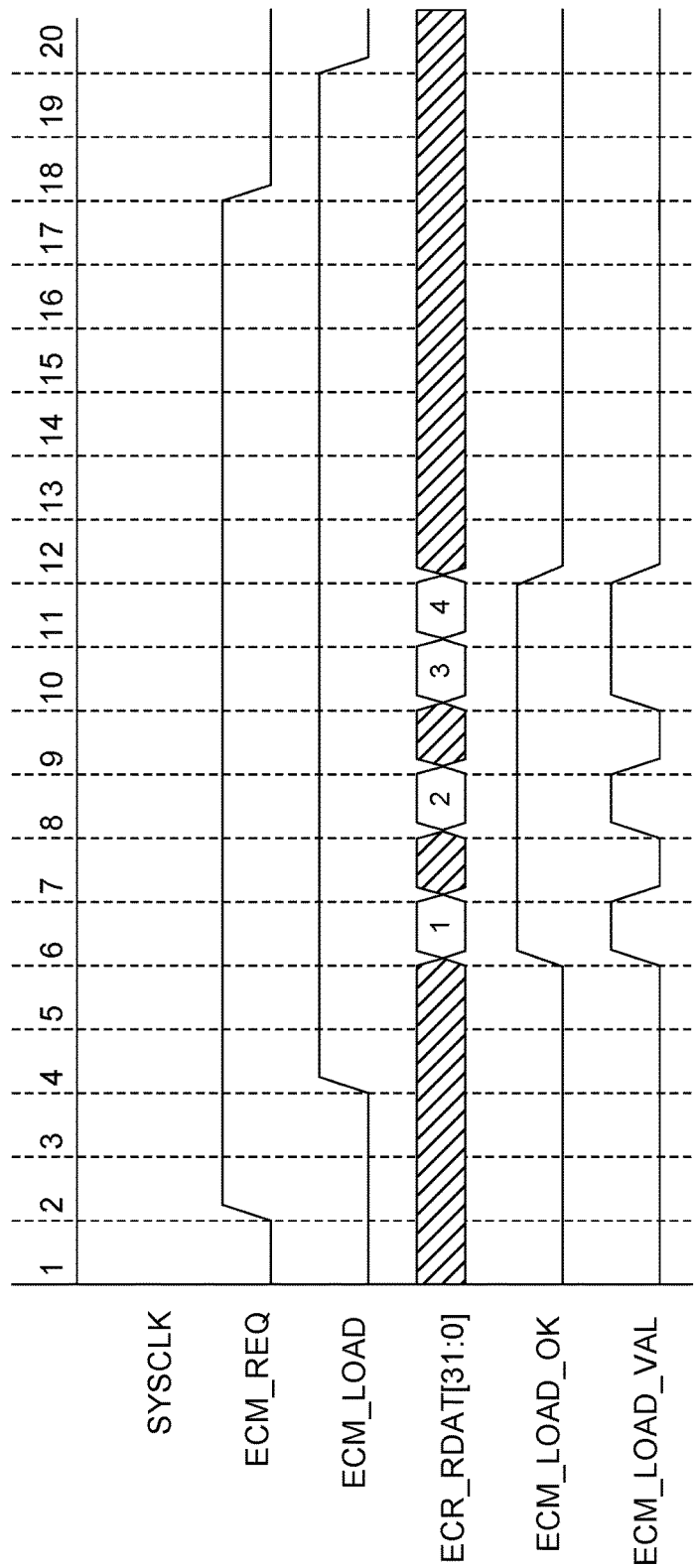
FIG. 9 illustrates a timing diagram for open request context loading: protocol error detected in PHY.

FIG. 9 illustrates a load abort due to a protocol error. Four Dwords are received, then during Dword reception, it is determined that there is an error in the middle of the received frame. The PHY generally detects the error, then sends the information back to the ECMR. It is clear from looking at FIG. 9 that something went wrong, since six Dwords were not received.

Figure 10:
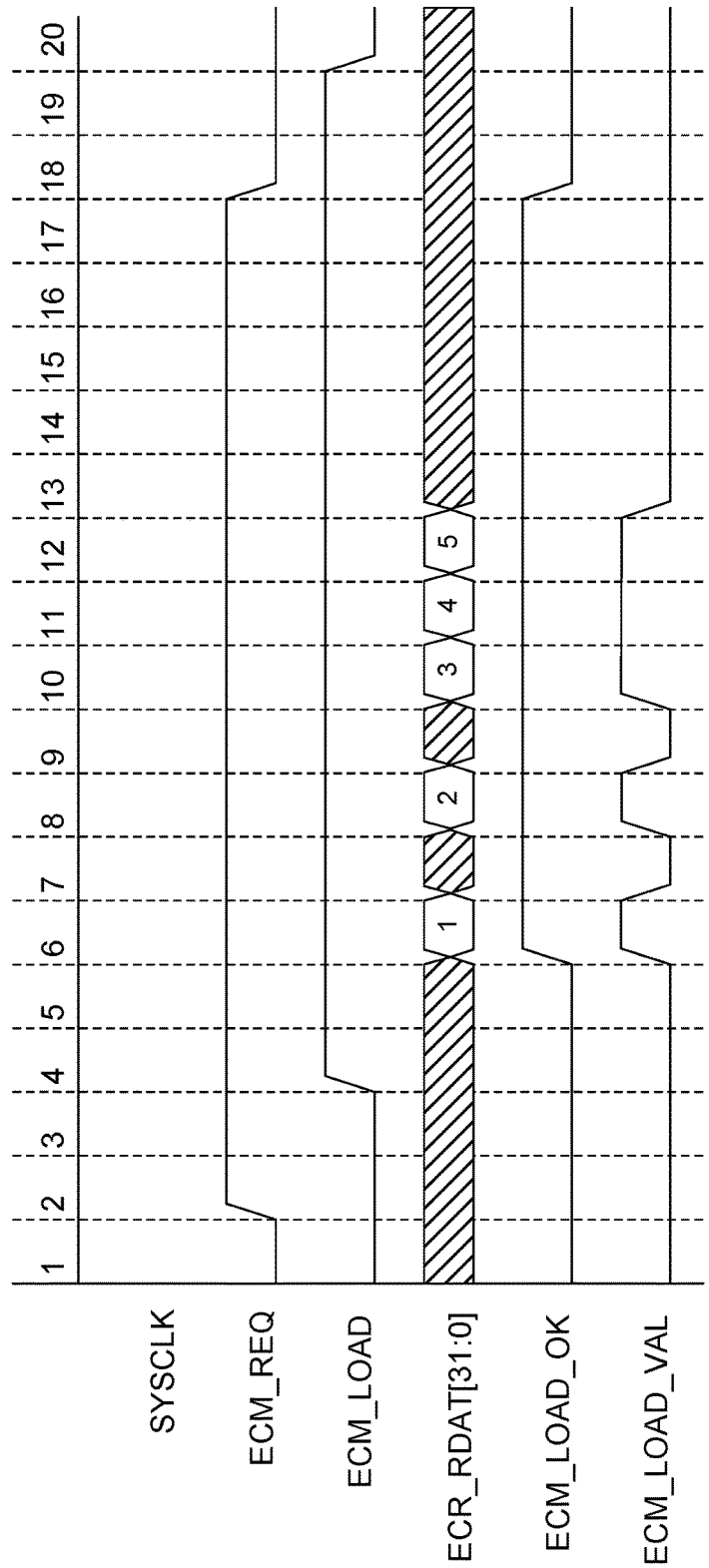
FIG. 10 illustrates a timing diagram for open request context loading: crc error detected in PHY.
Figure 11:
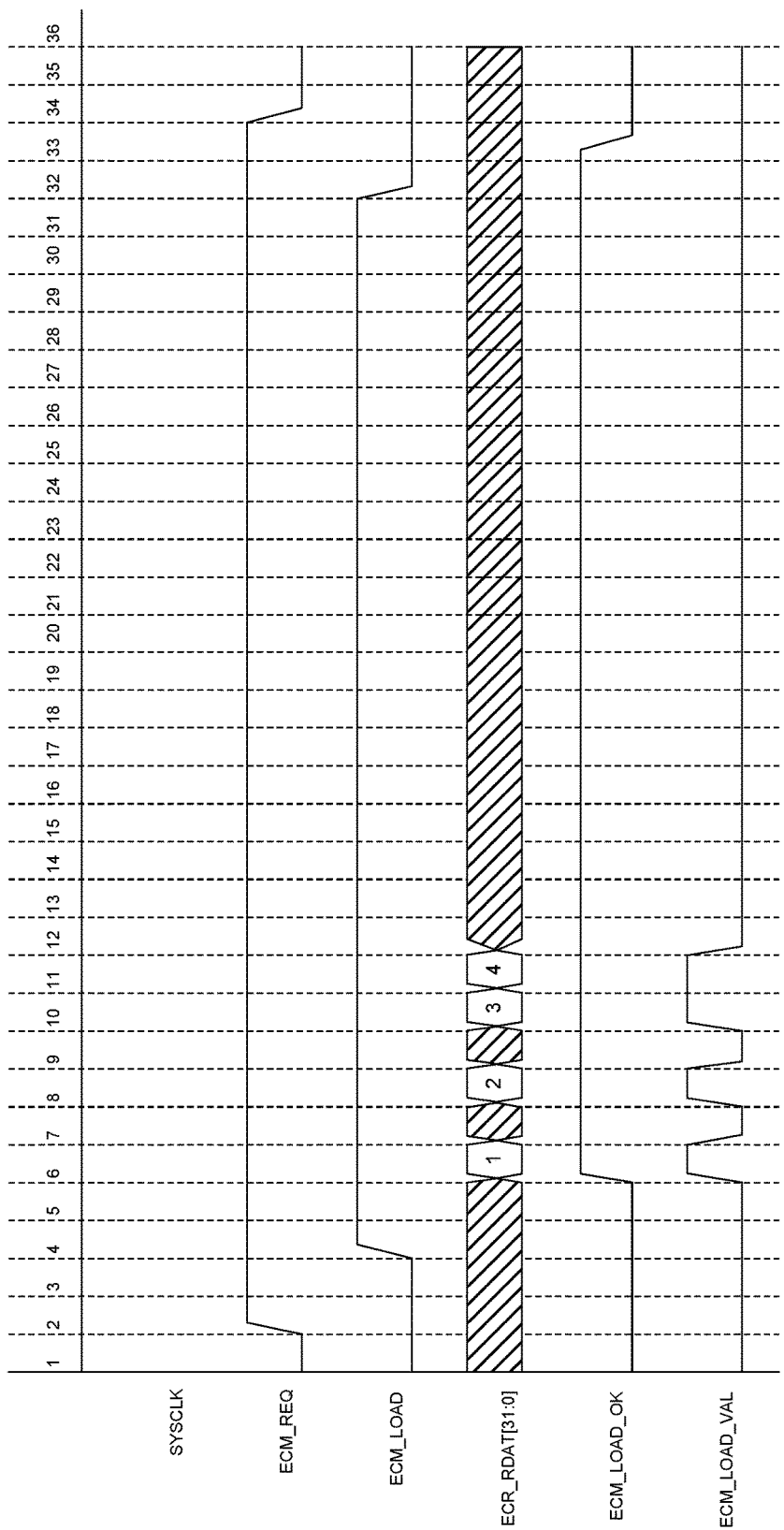
FIG. 11 illustrates a timing diagram for open request context loading: ecm timeout.

FIG. 10 illustrates a load abort due to a CRC error, since only the last (sixth) Dword is not there. The first five Dwords are received, but not the sixth, meaning that the CRC check revealed an error. FIG. 11 illustrates a load abort due to ECM timeout, and specifically a case where the full packet was not received from the line. In this case, a mechanism is needed to prevent lockup at the PHY, otherwise the CRC is completely locked up. In the CRC, the load signals not only allow the load, but preferably indicate a "timeout" such that loading is not permitted. In the example of FIG. 11, a load timer of a length of 32 clocks is set up such that if the PHY cannot finish loading the open frame during the 32 clocks, then the load signal will go "low".

Embodiments of the present invention can be implemented in various Application Specific Standard Products (ASSPs) such as those produced by PMC-Sierra Inc., including a 36-port SAS expander (product number PM8387), and a 24-port SAS expander (product number is PM8388). The cut-through processing can be done by two macro-blocks within the expander. One instance of each macro-block SXL_LT preferably exists in every port of their respective devices. One instance of each macro-block ECMR_LT preferably exists in each of their respective devices. Block diagrams of the core logic for the SXL_LT and ECMR_LT are shown in FIG. 12 and FIG. 13.

Figure 12:
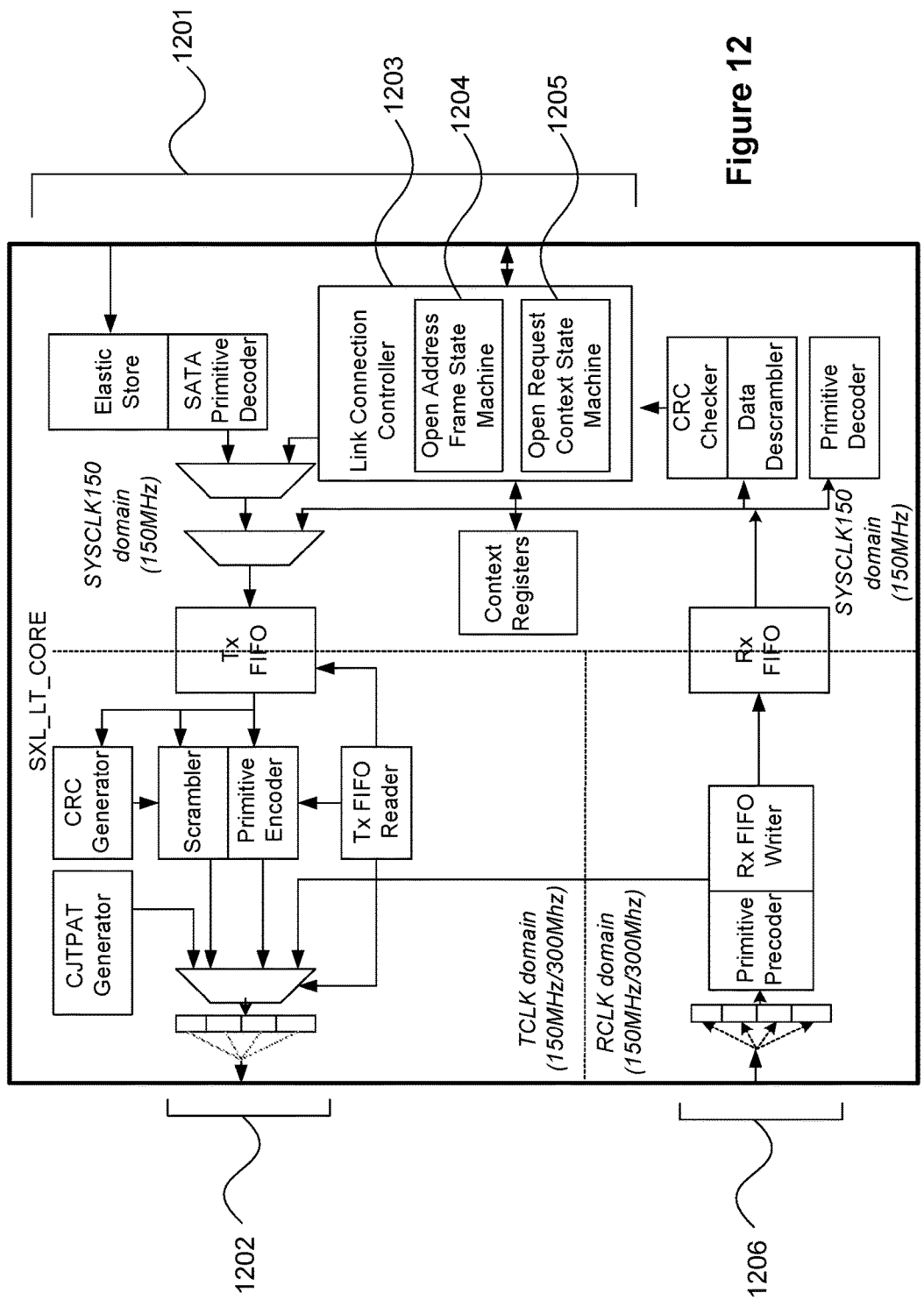
FIG. 12 illustrates a block diagram of an embodiment of cut-through processing logic in SXL_LT.
Figure 13:
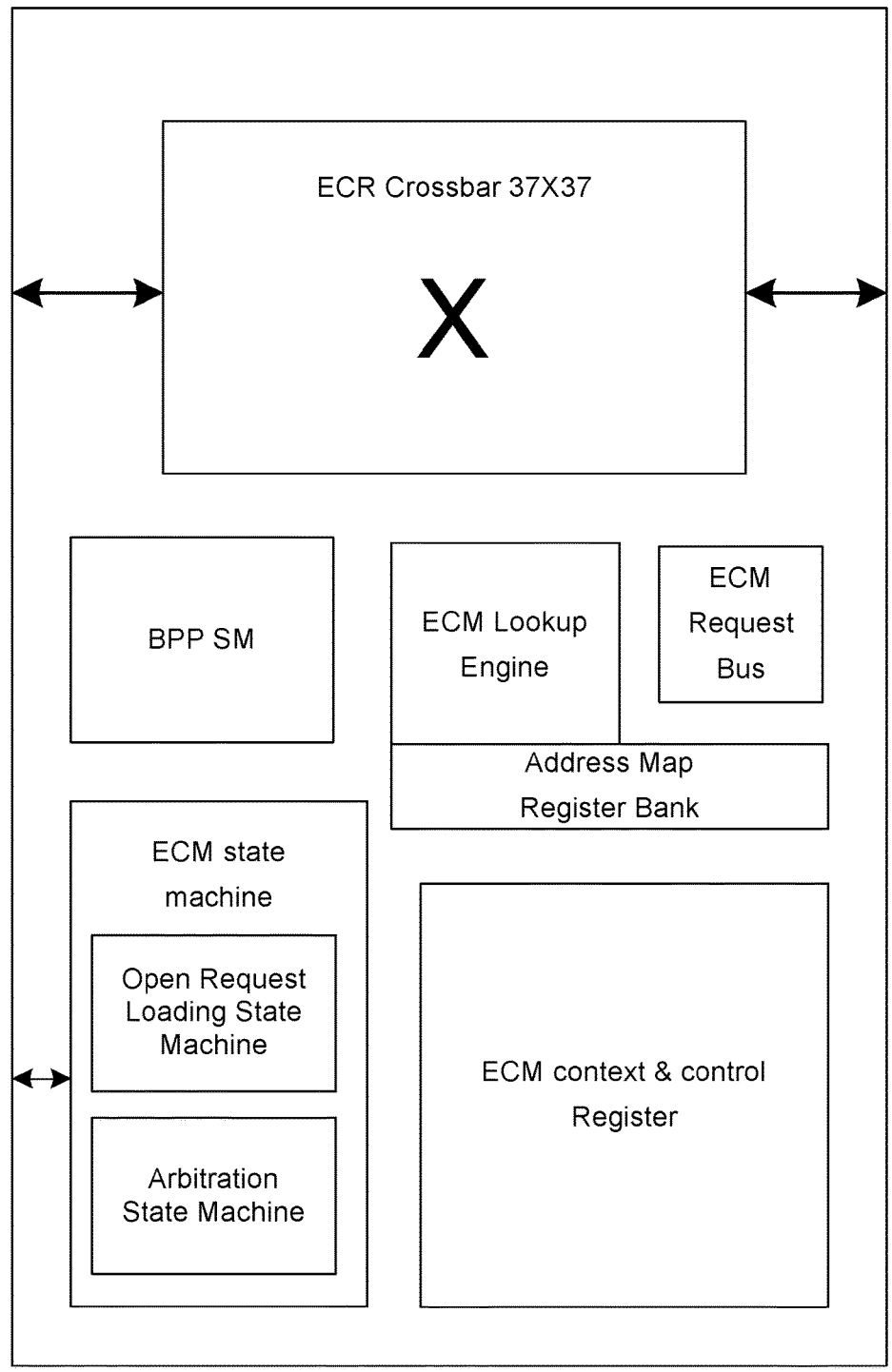
FIG. 13 illustrates a block diagram of an embodiment of cut-through processing logic in ECMR_LT.

FIG. 12 illustrates a block, alternatively referred to as SXL_LT_CORE, that interacts with the ECMR. It is a combination of the link and the PHY. In each port, there is a link and a PHY. The upper right-hand portion 1201 is the transmit side. In the normal SATA case, data comes in and enters the TX FIFO (to do cross-clock matching). After the TX FIFO, the data is passed to the CRC generator, scrambler, and primitive encoder. After that, the data is sent out on the top-left portion 1202. All of this is controlled by the link connection controller 1203, alternatively referred to as the link state machine. The link connection controller performs functions according to methods of embodiments of the present invention. It can be provided as a machine-readable medium storing statements and instructions which, when executed, cause a processor to perform steps in the method. All of the state machines described earlier are preferably provided in the link connection controller 1203. These include: an open address frame processor, or open frame receive state machine, 1204; and an open request context processor, or open frame loading state machine, 1205.

The receive portion 1206 of the block, for receiving data from the PHY, is shown in the bottom portion of FIG. 12. The receive portion decreases the delay by accelerating processing. The wider a bus is, the more delay there is, since there is more data in the pipeline. So, in this embodiment, the whole PHY is decreased to one byte, but the SAS spec is defined with respect to Dwords. So, the one byte wide input is separated into 32 bytes, to form a Dword. The block can include a receive data converter to convert the one-byte wide PHY input to the 32 byte wide Dword. The Dword is then sent to the RX FIFO Writer via the primitive precoder for initial decoding of certain primitives, then passed on to the RX FIFO. After the RX FIFO, there are several elements in the data path. A primitive decoder can output its result to the link connection controller 1203. The data is then sent through a data descrambler, then through a CRC checker. This CRC checker can provide the CRC check in the methods described earlier.

In summary, in an embodiment the present invention provides a link connection controller for processing an open address frame in a serial attached SCSI (SAS) network, comprising: an open address frame processor to assert an open request to an expander connection manager (ECM) of an expander while the open address frame is still being received at a source PHY; an open request context processor to perform an address lookup to determine a destination PHY while the open request context is still being loaded; and an arbitrator to perform arbitration in response to completion of a CRC check after the entire open address frame has been received at the source PHY. The arbitrator can include means to provide an arbitration result to the source PHY, set up a connection between the source PHY and the destination PHY in response to the arbitration result being an accept signal, and forward the open address frame with modified priority counters to the destination PHY along the connection. The controller can further include: a rate accommodator to accommodate variable port transmission rates by introducing wait states; a load value indicator to identify received data as a Dword or a gap; or a receive data converter to convert a one-byte wide PHY input to a 32 byte wide Dword.

Embodiments of the present invention can aid in minimizing the time for processing open address frame in SAS expander devices when setup a connection between an initiator and a target and ultimately optimizes the throughput of the whole SAS network.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for protocol error handling in a connection request between a source PHY and a destination PHY in a serial attached SCSI (SAS) network, the method comprising:
  receiving, at the source PHY, a stream of bytes of an SAS open address frame;
  in response to receiving the stream of bytes of the SAS open address frame, and before completion of receiving all of the bytes of the SAS open address frame:
    a) at the source PHY, performing an open address frame cut-through by forwarding an open request from the source PHY to an expander connection manager (ECM) of a SAS expander;
    b) loading an open request context from the source PHY to the ECM, the open request context being a subset of the SAS open address frame;
    c) at the ECM, performing an open request context cut-through by performing an address lookup to determine the destination PHY while loading the open request context from the source PHY; and
    d) at the source PHY, detecting a protocol error in the received bytes of the SAS open address frame, the protocol error comprising a SAS primitive within the SAS open address frame, and at the ECM, aborting the address lookup and the loading of the open request context, before completion of either the address lookup or the loading of the open request context;
  wherein detecting the protocol error in the received bytes of the SAS open address frame at the source PHY comprises one of:
    transitioning a state machine of the source PHY to an idle state; and
    transitioning a state machine of the ECM to an idle state.

2. The method of claim 1, wherein the SAS primitive is a Dword whose first character is a K28.3 or K28.5 control character.

3. The method of claim 1, wherein the SAS open address frame comprises a start of address frame (SOAF) primitive, a plurality of Dwords, and an end of address frame (EOAF) primitive, and wherein the open request is forwarded in response to receipt of a first Dword following the SOAF primitive.

4. The method of claim 3, further comprising storing an open address frame context at the source PHY in response to receipt of the SOAF primitive.

5. The method of claim 1, further comprising:
  receiving, at the source PHY, an SAS frame; and
  performing a frame type check to identify the received SAS frame as the SAS open address frame.

6. The method of claim 1, wherein the open request context comprises a plurality of Dwords and wherein information regarding protocol and connection rate are provided in the same Dword as a priority counter.

7. The method of claim 1, wherein detecting the protocol error in the received bytes of the SAS open address frame at the source PHY comprises aborting the connection request before a start of an arbitration process at the ECM.

8. A link connection controller system for processing a connection request between a source PHY and a destination PHY in a serial attached SCSI (SAS) network, comprising:
a source PHY having an SAS open address frame processor; and
an SAS expander having an expander connection manager (ECM) and an open request context processor;
wherein the SAS open address frame processor of the source PHY is configured to:
receive a stream of bytes of an SAS open address frame;
in response to receiving the stream of bytes of the SAS open address frame, and before completion of receiving all of the bytes of the SAS open address frame:
perform an open address frame cut-through by forwarding an open request to the ECM of the SAS expander; and
detect a protocol error in the received bytes of the SAS open address frame, the protocol error comprising a SAS primitive within the SAS open address frame; and
wherein the open request context processor of the SAS expander is configured to:
load an open request context from the source PHY to the ECM, the open request context being a subset of the SAS open address frame;
perform an open request context cut-through by performing an address lookup to determine the destination PHY while loading the open request context from the source PHY; and
in response to the detected protocol error, abort the address lookup and the open request context load, before completion of either the address lookup or the open request context load;
wherein, at least one of:
the SAS open address frame processor is further configured to, in response to the detected protocol error, transition a state machine of the SAS open address frame processor to an idle state; and
the open request context processor is further configured to, in response to the detected protocol error, transition a state machine of the open request context processor to an idle state.

9. The link connection controller system of claim 8, wherein the SAS primitive is a Dword whose first character is a K28.3 or K28.5 control character.

10. The link connection controller system of claim 8, wherein the SAS open address frame comprises a start of address frame (SOAF) primitive, a plurality of Dwords, and an end of address frame (EOAF) primitive, and wherein the open request is forwarded in response to receipt of a first Dword following the SOAF primitive.

11. The link connection controller system of claim 10, wherein the SAS open address frame processor is further configured to store an open address frame context at the source PHY in response to receipt of the SOAF primitive.

12. The link connection controller system of claim 8, wherein the SAS open address frame processor is further configured to:
receive a SAS frame; and
perform a frame type check to identify the received SAS frame as the SAS open address frame.

13. The link connection controller system of claim 8, wherein the open request context comprises a plurality of Dwords and wherein information regarding protocol and connection rate are provided in the same Dword as a priority counter.

14. The link connection controller system of claim 8, wherein the open request context processor is further configured to, in response to the detected protocol error, abort the connection request before a start of an arbitration process at the ECM.

* * * * *